United States Patent
Kim

(10) Patent No.: US 7,104,609 B2
(45) Date of Patent: Sep. 12, 2006

(54) LONGITUDINAL EXTENSION MECHANISM OF ARMREST

(75) Inventor: Seok-Hwan Kim, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/024,865

(22) Filed: Dec. 28, 2004

(65) Prior Publication Data

US 2006/0006722 A1    Jan. 12, 2006

(30) Foreign Application Priority Data

Jul. 9, 2004  (KR) .................. 10-2004-0053547

(51) Int. Cl.
  *A47C 7/62* (2006.01)
  *A47C 7/54* (2006.01)
  *B60N 2/46* (2006.01)
(52) U.S. Cl. .............................. 297/411.35; 297/411.3; 297/411.32; 297/411.38; 297/188.15; 297/188.16; 297/188.17; 297/284.11
(58) Field of Classification Search ........... 297/411.35, 297/411.32, 411.2, 411.21, 411.3, 411.36, 297/411.37, 411.38, 188.17, 188.16, 188.15, 297/284.11
See application file for complete search history.

(56) References Cited

U.S. PATENT DOCUMENTS

| | | | | |
|---|---|---|---|---|
| 4,040,659 A | * | 8/1977 | Arnold ................... | 297/188.17 |
| 5,060,899 A | * | 10/1991 | Lorence et al. ...... | 297/188.17 X |
| 5,232,262 A | * | 8/1993 | Tseng ..................... | 297/188.17 |
| 5,246,269 A | * | 9/1993 | DeBoer et al. ...... | 297/188.17 X |
| 5,253,838 A | * | 10/1993 | Spykerman ........ | 297/188.17 X |
| 5,284,314 A | * | 2/1994 | Misaras et al. ..... | 297/188.17 X |
| 5,297,767 A | * | 3/1994 | Miller et al. ........ | 297/188.17 X |
| 5,330,146 A | * | 7/1994 | Spykerman ........ | 297/188.17 X |
| 5,372,403 A | * | 12/1994 | Puerto ................... | 297/188.17 |
| 5,375,805 A | * | 12/1994 | Sudak et al. ........ | 297/188.17 X |
| 5,524,958 A | * | 6/1996 | Wieczorek et al. .... | 297/188.17 |
| 5,588,697 A | * | 12/1996 | Yoshida et al. ..... | 297/188.17 X |
| 5,601,269 A | * | 2/1997 | Jankovic ............ | 297/188.17 X |
| 5,620,228 A | * | 4/1997 | Ito et al. ................ | 297/188.17 |
| 5,660,433 A | * | 8/1997 | Bruhnke et al. ....... | 297/188.17 |
| 5,779,302 A | * | 7/1998 | Geier et al. ............ | 297/188.17 |
| 5,791,616 A | * | 8/1998 | Volkmann et al. .. | 297/188.17 X |
| 5,797,655 A | * | 8/1998 | Miles ................ | 297/188.17 X |
| 5,876,007 A | * | 3/1999 | Lancaster et al. ... | 297/188.17 X |

(Continued)

FOREIGN PATENT DOCUMENTS

DE          4015872 C1 *  1/1992  ............ 297/411.38

(Continued)

*Primary Examiner*—Rodney B. White
(74) *Attorney, Agent, or Firm*—Morgan Lewis & Bockius LLP

(57) ABSTRACT

There is provided a longitudinal extension mechanism of an armrest that includes a main body of an armrest, a fixed hinge shaft being non-rotatably fixed to a bracket and serving as a rotation axis of the armrest main body, an armrest extension provided at an end of the armrest main body so as to straightly move in the longitudinal direction of the armrest main body, and a length extending apparatus for allowing the armrest extension to straightly move with respect to the arm rest main body due to rotation of the armrest main body about the fixed hinge shaft. Therefore, when the armrest rotates to a horizontal posture, the armrest extension automatically protrudes by a certain length and the total length of the armrest is increased, thereby maximizing the convenience to a user. In addition, when the armrest rotates to a vertical posture, the total length of the armrest is decreased, thereby improving a reception ability and appearance.

10 Claims, 2 Drawing Sheets

U.S. PATENT DOCUMENTS

| | | | |
|---|---|---|---|
| 6,601,918 B1 * | 8/2003 | Mattsson | 297/284.11 |
| 6,705,675 B1 * | 3/2004 | Eastman et al. | 297/411.37 X |
| 6,857,700 B1 * | 2/2005 | Eastman et al. | 297/411.35 X |
| 2001/0000639 A1 * | 5/2001 | Park et al. | 297/411.3 |
| 2001/0004164 A1 * | 6/2001 | Mattsson | 297/284.11 |
| 2001/0015566 A1 * | 8/2001 | Park et al. | 297/411.36 X |

FOREIGN PATENT DOCUMENTS

| | | | | |
|---|---|---|---|---|
| JP | 57104423 A | * | 6/1982 | 297/411.32 |
| JP | 63038046 A | * | 2/1988 | 297/411.38 |

* cited by examiner

LONGITUDINAL EXTENSION MECHANISM OF ARMREST

CROSS-REFERENCE TO RELATED APPLICATIONS

This application claims priority of Korean Application No. 10-2004-0053547, filed on Jul. 9, 2004, the disclosure of which is incorporated fully herein by reference.

FIELD OF THE INVENTION

The present invention relates to a longitudinal extension mechanism of an armrest, and more particularly to an apparatus for extending a front end of an armrest when rotating the armrest from its vertical posture to its horizontal posture for use.

BACKGROUND OF THE INVENTION

In general, armrests provided at seats of vehicles could be put in a vertical posture when they are not used and the armrests could be rotated to a horizontal posture when they are used, thereby maximizing the use of available space. In such a rotatable armrest, a rotation axis is fixed to a seat back, other constituent parts such as a recliner, etc. are also fitted to the seat back, and it is not desirable that a front end of the armrest when vertical protrudes from the top end of the seat back. Accordingly, the length of the armrest is restricted.

However, for the purpose of convenient use of the armrest, the arm rest must have a maximum length. Specifically, when a cup holder, etc. is provided at the front end of the armrest, the armrest should be long enough to allow a user to use the cup holder with a comfortable posture. Accordingly, it would be desirable to provide an armrest that addresses the above drawbacks and requirements.

SUMMARY OF THE INVENTION

The present invention is adapted to provide a longitudinal extension mechanism of an armrest in which the length of the armrest having a rotation axis fixed to a seat back can be automatically adjusted by means of manipulation of a user, thereby creating good appearances of the armrest and peripheral devices thereof and maximizing convenience of the armrest.

According to an aspect of the present invention, a longitudinal extension mechanism of an armrest comprises a main body of an armrest and a fixed hinge shaft being non-rotatably fixed to a bracket and serving as a rotation axis of the armrest main body. An armrest extension is provided at an end of the armrest main body so as to move straight in the longitudinal direction of the armrest main body. Length extending means allows the armrest extension to move straight with respect to the armrest main body by means of rotation of the armrest main body about the fixed hinge shaft.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Figure 1:
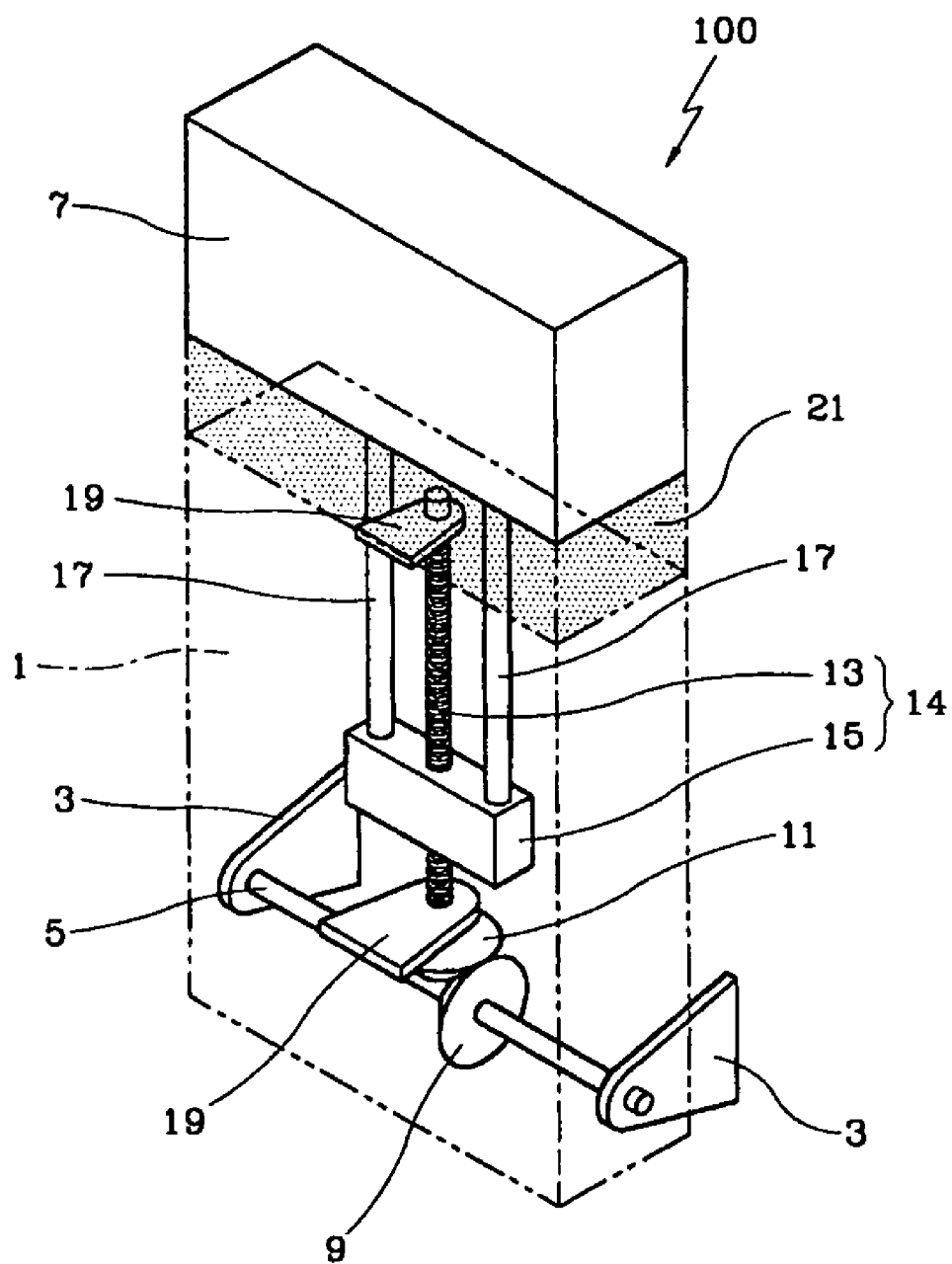
FIG. 1 is a diagram illustrating a longitudinal extension mechanism of an armrest according to the present invention, where the longitudinal extension mechanism has a vertical posture.
Figure 2:
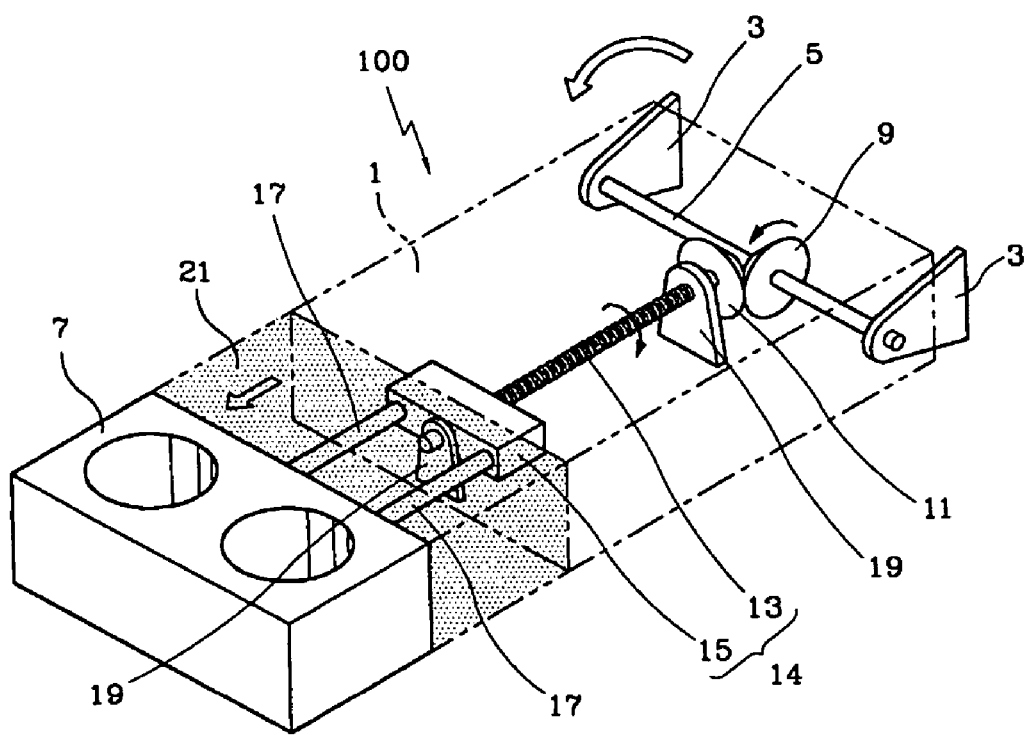
FIG. 2 is a diagram illustrating the longitudinal extension mechanism of an armrest according to the present invention, where the longitudinal extension mechanism has a horizontal posture for use.

Hereinafter, embodiments of the present invention will be described in detail with reference to the accompanying drawings. Referring to FIGS. 1 and 2, a longitudinal extension mechanism of an armrest according to an embodiment of the present invention comprises an armrest main body 1, a fixed hinge shaft 5 being non-rotatably fixed to a bracket 3 and serving as a rotation axis of the armrest main body 1, an armrest extension 7 provided at an end of the armrest main body 1 so as to move straight in the longitudinal direction of the armrest main body 1, and length extending means for allowing the armrest extension 7 to move straight with respect to the arm rest main body 1 by means of rotation of the armrest main body 1 about the fixed hinge shaft 5. The bracket 3 is fixed to a seat back (not shown) so as to support the fixed hinge shaft 5.

In the present embodiment, the length extending means includes a fixed bevel gear 9 fixed to the fixed hinge shaft 5, a rotational bevel gear 11 engaging with the fixed bevel gear 9 and having a rotation axis parallel to the longitudinal direction of the armrest main body 1, a lead screw 14 having a screw 13 integrally connected to the rotational bevel gear 11 and serving as a rotation axis of the rotational bevel gear 11, and a connecting member 17 connecting a nut 15 of the lead screw 14 to the armrest extension 7.

The lead screw 14 has the screw 13 and the nut 15. The nut 15 is allowed to move straight on the screw 13 by means of rotation of the screw 13. The screw 13 is rotatably supported by a support 19 provided at the inside of the armrest main body 1. In some embodiments, the armrest extension 7 includes a cup holder so as to improve user convenience.

On the other hand, a cover 21 covering a gap between the armrest main body 1 and the armrest extension 7 is provided therebetween. In the present embodiment, the cover 21 is made of an extensible material of which both ends are fixed to the armrest main body 1 and the armrest extension 7, respectively. Therefore, when the armrest extension 7 straightly moves with respect to the armrest main body 1, the variable gap between the armrest extension 7 and the armrest main body 1 is not exposed, i.e., is covered by the cover 21.

Operation of the present embodiment will now be described. In FIG. 1, the armrest 100 has a vertical posture and in FIG. 2, the armrest 100 has a horizontal posture. By allowing the armrest main body 1 to rotate about the fixed hinge shaft 5, the posture shown in FIG. 1 and the posture shown in FIG. 2 are switched to each other. The switching of the armrest main body 1 between the vertical posture and the horizontal posture may be carried out manually by a user, but may also may be carried out automatically using an additional motor, etc.

When the armrest main body 1 rotates to the horizontal posture from the posture shown in FIG. 1, the rotational bevel gear 11 is made to rotate by the fixed bevel gear 9 integrally fixed to the fixed hinge shaft 5. The rotating power of the rotational bevel gear 11 is transferred directly to the lead screw 14, so that the nut 15 moves straight by means of rotation of the screw 13. The straight movement of the nut 15 is transferred to the armrest extension 7 through the connecting member 17.

Then, as shown in FIG. 2, the armrest extension 7 is extended toward the front end of a vehicle (in a vehicle with forward and facing seats). At this time, the gap between the armrest extension 7 and the armrest main body 1 is covered with the cover 21. Therefore, a user can conveniently use the extended armrest 100. Specifically, when the armrest extension 7 comprises the cup holder as in the present embodiment, a user can use the cup holder with a comfortable posture.

When the armrest 100 rotates from the posture shown in FIG. 2 to the posture shown in FIG. 1, the rotational bevel gear 11 reversely rotates and the nut 15 moves toward the rotational bevel gear 11 together with the armrest extension 7, so that the total length of the armrest 100 is decreased and the armrest 100 can be easily received.

As described above, in the longitudinal extension mechanism of an armrest according to the present invention, when the armrest rotates to a horizontal posture, the armrest extension automatically protrudes by a certain length and the total length of the armrest is increased, thereby maximizing user convenience. In addition, when the armrest rotates to a vertical posture, the total length of the armrest is decreased, thereby improving a reception ability and appearance.

What is claimed is:

1. A longitudinal extension mechanism of an armrest comprising:
    a main body of an armrest;
    a fixed hinge shaft being non-rotatably fixed to a bracket and serving as a rotation axis of the armrest main body;
    an armrest extension provided at an end of the armrest main body so as to move in a longitudinal direction of the armrest main body; and
    length extending means for moving the armrest extension in the longitudinal direction of the arm rest main body;
    wherein rotation of the armrest main body about the fixed hinge shaft causes said moving.

2. The longitudinal extension mechanism of the armrest as defined in claim 1, wherein the length extending means comprises;
    a fixed bevel gear fixed to the fixed hinge shaft;
    a rotational bevel gear engaging with the fixed bevel gear and having a rotation axis parallel to the longitudinal direction of the armrest main body;
    a lead screw having a screw integrally connected to the rotational bevel gear and serving as a rotation axis of the rotational bevel gear; and
    a connecting member connecting a nut of the lead screw to the armrest extension.

3. The longitudinal extension mechanism of the armrest as defined in claim 1, wherein the armrest extension comprises a cup holder.

4. The longitudinal extension mechanism of the armrest as defined in claim 1, further comprising a cover covering a gap between the armrest main body and the armrest extension.

5. The longitudinal extension mechanism of the armrest as defined in claim 4, wherein the cover is made of an extensible material of which both ends are fixed to the armrest main body and the armrest extension, respectively.

6. A longitudinal extension mechanism of an armrest comprising:
    a fixed hinge shaft being non-rotatably fixed to a bracket that is configured to be coupled to a seat back;
    a main body having a longitudinal axis between opposing first and second ends, where said first end is rotatably coupled to said fixed hinge shaft;
    an armrest extension provided at said second end of said main body and configured to move along said longitudinal axis; and
    a length extender that causes the armrest extension to move away from said fixed hinge shaft as a result of said main body rotating into a horizontal position.

7. The longitudinal extension mechanism of the armrest as defined in claim 6, wherein the length extender comprises;
    a fixed bevel gear fixed to the fixed hinge shaft;
    a rotational bevel gear engaged with the fixed bevel gear and having a rotation axis parallel to the longitudinal direction of the main body;
    a lead screw having a screw integrally connected to the rotational bevel gear and serving as a rotation axis of the rotational bevel gear; and
    a connecting member connecting a nut of the lead screw to the armrest extension.

8. The longitudinal extension mechanism of the armrest as defined in claim 6, wherein the armrest extension comprises a cup holder.

9. The longitudinal extension mechanism of the armrest as defined in claim 6, further comprising a cover covering a gap between the armrest main body and the armrest extension.

10. The longitudinal extension mechanism of the armrest as defined in claim 9, wherein the cover is made of an extensible material whose ends are fixed to the armrest main body and the armrest extension, respectively.

* * * * *